US006892106B2

(12) United States Patent
Wu et al.

(10) Patent No.: US 6,892,106 B2
(45) Date of Patent: May 10, 2005

(54) BALANCING WORK RELEASE BASED ON BOTH DEMAND AND SUPPLY VARIABLES

(75) Inventors: Kan Wu, Hsinchu (TW); Chiang-Chou Lo, Hsinchu (TW); Po-Chun Lai, Hsinchu (TW); Hsu-Jen Chen, Hsinchu (TW); Ming-Cheng Chien, Taichung (TW); Wei-Jai Hung, Chupei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 10/394,604

(22) Filed: Mar. 21, 2003

(65) Prior Publication Data

US 2004/0186605 A1 Sep. 23, 2004

(51) Int. Cl.[7] ............................................. G06F 19/00
(52) U.S. Cl. ........................................ 700/101; 700/102
(58) Field of Search .................................. 700/99–102

(56) References Cited

U.S. PATENT DOCUMENTS

| | | | |
|---|---|---|---|
| 5,544,350 A | 8/1996 | Hung et al. | |
| 5,546,326 A | 8/1996 | Tai et al. | |
| 5,586,021 A | 12/1996 | Fargher et al. | |
| 5,612,886 A | 3/1997 | Weng | |
| 5,751,580 A | 5/1998 | Chi | |
| 5,818,716 A | 10/1998 | Chin et al. | |
| 5,825,650 A | 10/1998 | Wang | |
| 5,826,238 A | 10/1998 | Chen et al. | |
| 5,841,677 A | 11/1998 | Yang et al. | |
| 5,880,960 A | 3/1999 | Lin et al. | |
| 5,928,389 A | 7/1999 | Jevtic | |
| 5,943,484 A | * 8/1999 | Milne et al. | ................. 700/100 |
| 6,263,253 B1 | 7/2001 | Yang et al. | |
| 6,353,769 B1 | 3/2002 | Lin | |
| 6,356,797 B1 | 3/2002 | Hsieh et al. | |
| 6,415,260 B1 | 7/2002 | Yang et al. | |
| 6,434,443 B1 | 8/2002 | Lin | |

* cited by examiner

*Primary Examiner*—Albert W. Paladini
*Assistant Examiner*—Ryan Jarrett
(74) *Attorney, Agent, or Firm*—Slater & Matsil, L.L.P.

(57) ABSTRACT

A systematic approach for generating a work release plan that considers both demand and supply variables. The approach comprises prioritizing scheduled lots in order of their critical ratios, estimating an initial daily release quota for the scheduled lots based on both pull and push requirements, and determining detailed capacity constraints for the manufacturing system. The approach further comprises testing whether the initial daily release quota complies with the detailed capacity constraints, and, if the detailed capacity constraints are violated, rearranging the lots in the initial daily release quota so that the detailed capacity constraints are met.

20 Claims, 3 Drawing Sheets

| DAY | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| OUTPUT | PRODUCT A | | | | | | | | | 100 | 100 | 100 | 100 | 100 | 100 | 100 | 100 | 100 | 100 | 100 | 100 |
| | PRODUCT B | | | | | | | 900 | 900 | 900 | 900 | 900 | 900 | 900 | | | | | | |
| START | PRODUCT A | 100 | 100 | 100 | 100 | 100 | 100 | 100 | 100 | 100 | 100 | 100 | 100 | | | | | | | | |
| | PRODUCT B | | 900 | 900 | 900 | 900 | 900 | 900 | 900 | 500 | 500 | 500 | | | | | | | | | |
| *CYCLE TIME OF PRODUCT A IS 8 DAYS AND PRODUCT B IS 6 DAYS | | | | | | | | | | | | | | | | | | | | | |

BALANCING WORK RELEASE BASED ON BOTH DEMAND AND SUPPLY VARIABLES

TECHNICAL FIELD

The present invention relates generally to balancing work release in a manufacturing system, and more particularly to balancing work release based on both demand and supply requirements and conditions.

BACKGROUND

Manufacturers are continually striving to improve the efficiency of their manufacturing operations to gain or maintain an advantage over their competition. Properly controlling the amount of work released into a manufacturing system and the dispatching work to work centers within the system generally are important for maximizing the throughput of the system. These control functions, however, may be affected by many variables in the system, especially in a complicated manufacturing process. For example, modern semiconductor integrated circuit manufacturing may involve hundreds of steps, with multiple products being manufactured at the same time. In addition, various work stages may take different amounts of time to complete, and some stages may operate on individual wafer lots, while others may operate on several wafer lots at the same time in a batch mode.

To improve control of the manufacturing process, various methods of controlling the release of work have been implemented in manufacturing operations such as semiconductor fabrication facilities (fabs). Traditional work release policies generally may be classified into two different types of approaches, push systems such as material requirements planning (MRP), and pull systems such as constant work-in-progress (CONWIP). There are, however, drawbacks to each approach.

As a push type system, MRP generally releases lots into a manufacturing facility according to a demand plan. MRP determines what assemblies must be built and what materials must be procured in order to build a unit of work by a certain date. MRP queries the bill of materials and inventory databases to derive the necessary elements. One disadvantage of the MRP approach, however, is that it does not consider plant conditions in determining the work release plan. Because of limitations in the plant, an MRP-generated schedule may get so far ahead of production that it can overwhelm the manufacturing plant with work-in-progress (WIP).

In contrast, as a pull type system, CONWIP generally releases lots according to a pre-defined work in progress cap or limit. Because CONWIP considers the manufacturing facility's conditions, it generally avoids the MRP problem of excessive WIP. CONWIP, however, generally considers the facility status in only a rudimentary manner, and is not sufficiently detailed to account for dynamic fab conditions.

Another potential problem with CONWIP is that it generally does not consider the capacity impact of complex product mixes or customer requests. Critical ratio (C/R) may be defined as [Master Production Schedule (MPS) date– Work Start date]/[Forecast cycle time (C/T)]. For a semiconductor fab, Work Start is Wafer Start (W/S). Forecast C/T may be determined using historical fab data. C/R can provide a measure of the urgency of each lot for meeting on-time delivery. When C/R>1, a lot is ahead of schedule; when C/R<1, a lot is behind schedule. C/R may measure demand through the MPS value and supply through the forecast C/T. If a wafer only starts when C/R=1 and forecast C/T uses a fixed and maintained number, then this is generally the same as the MRP approach. C/R is generally only meaningful inside the same product group, however, because it cannot objectively compare products that belong to different capacity constraints.

In some situations, production control (PC) planners may rely on their own personal experience to determine a work release plan. For example, they may attempt to estimate a wafer start quantity in an informal manner based on some combination of the monthly MPS target, the fab front-end machine conditions (M/C), WIP conditions, and customer requests. For example, for production lots, PC account planners book lots on booking files. Then PC fab planners schedule new-booked lots on the Manufacturing Execution System (MES), checking whether part status is ready or not. Then PC fab planners reschedule all lots according to critical ratio and fab line balance.

For pilot lots and probe card wafers, PC account planners book lots on booking files according to Engineering Notice/Order Management. Then PC pilot planners schedule new-booked lots on the MES, checking whether mask status is ready or not. Finally, for engineering lots/loop test, Engineering Integration engineers issue an application form, then PC pilot planners schedule lots on the MES. Obviously, the success of such an experience-based approach depends heavily on the level of experience and skill of the individual, and a wide range of results may be realized when relying on personal experience as a guide for work release.

Currently, there does not exist a systematic approach for determining the proper amount of work to release to a production line without the limitations of the approaches described above.

SUMMARY OF THE INVENTION

These and other problems are generally solved or circumvented, and technical advantages are generally achieved, by preferred embodiments of the present invention which use a systematic approach for generating a work release plan that considers both demand and supply variables.

In accordance with a preferred embodiment of the present invention, a method for generating a work release plan for a manufacturing system comprises prioritizing scheduled lots in order of their critical ratios, estimating an initial daily release quota for the scheduled lots based on both pull and push requirements, and determining detailed capacity constraints for the manufacturing system. The method further comprises testing whether the initial daily release quota complies with the detailed capacity constraints, and, if the detailed capacity constraints are violated, rearranging the lots in the initial daily release quota so that the detailed capacity constraints are met.

An advantage of a preferred embodiment of the present invention is the achievement of higher customer satisfaction by releasing lots into the manufacturing system in accordance with customer requests.

A further advantage of a preferred embodiment of the present invention is the reduction of the manufacturing facility's cycle time by smoothing the WIP profile.

Another advantage of a preferred embodiment of the present invention is that it assists in achieving the fabrication facility's output target.

Yet another advantage of a preferred embodiment of the present invention is that the systematic balancing of both demand and supply variables provides a work release policy that is generally independent of controllers' personal experience.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wafer start policy in a semiconductor fab producing integrated circuits. The invention may also be applied, however, to other manufacturing systems generating other products. In particular, manufacturing lines that operate on a multiple products at the same time, and with variable processing at work centers in the line, should benefit from the balanced work release system and method disclosed herein.

Figure 1:
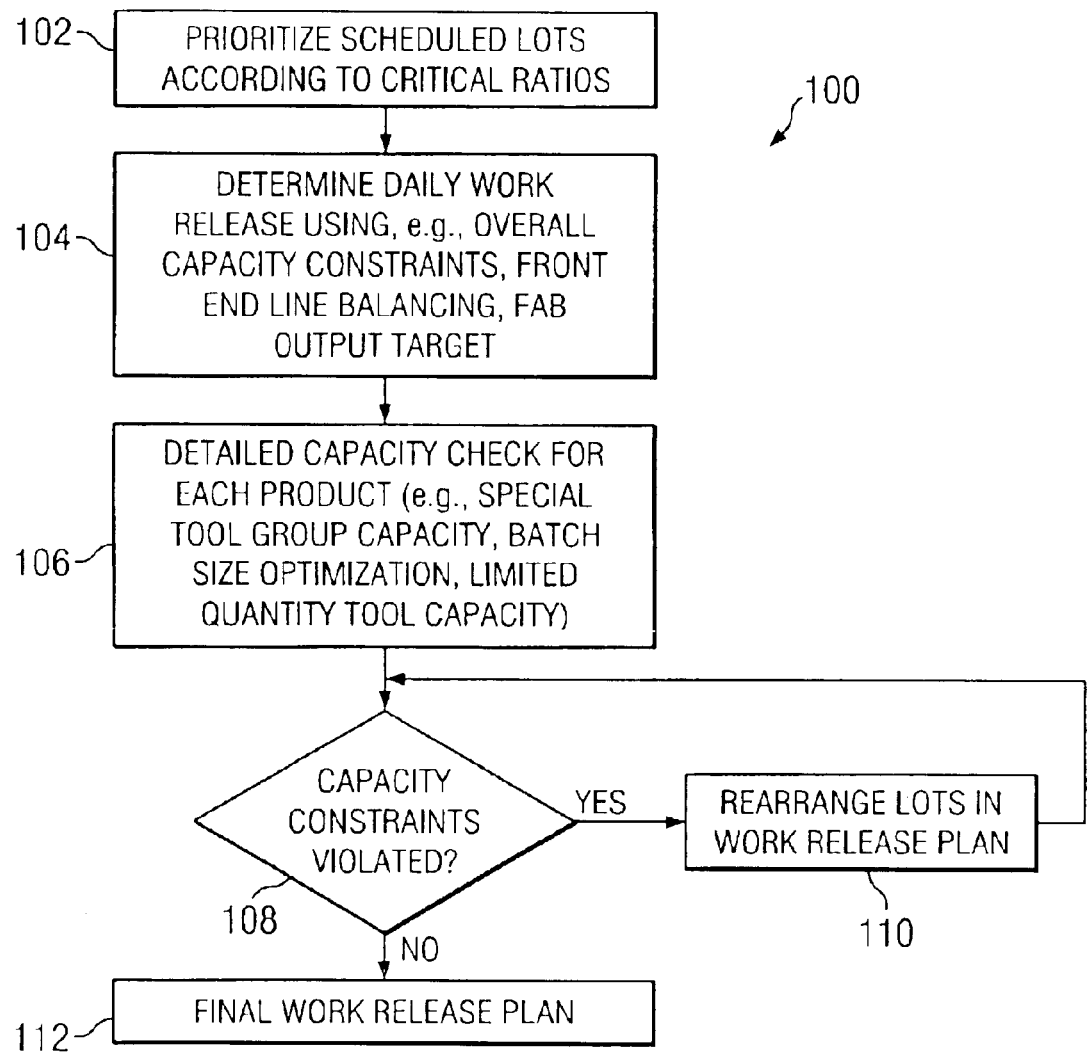
FIG. 1 is a flowchart of a preferred embodiment method of generating a work release plan.

In a preferred embodiment, a procedure for generating a work release plan is illustrated by flowchart 100 in FIG. 1. First all of the scheduled lots are ordered according to their C/R, lowest to highest, in step 102. Then a daily work start quota is determined by finding the minimum one of the following variables: overall capacity constraints and front end line balance, in step 104. Alternatively, the fab or MPS output target requirement, which is the current day's quota plus any prior non-released quota, also may be considered in determining the daily work start quota.

Next, in step 106, a detailed capacity check is performed for the following constraints: capacity for special tool groups (e.g., poly-etchers for memory products), batch size optimization (e.g., for a furnace), and availability of limited quantity tools (e.g., photolithography masks). Step 108 tests whether any of these constraints are violated by a particular lot. If so, and if other lots are available for release, step 110 pushes the limiting lot out and pulls the other lots in to make up for any shortage in the original daily quota. When no constraints are violated, step 112 provides the final work release plan.

Generally, this method uses both demand and supply variables to generate the work release plan. Critical ratio and fab output target requirement are push oriented, while capacity limit and front end line balance are both pull oriented. The final work release plan thus takes into account more variables than either a push system or pull system alone, and does not rely on a planner's personal experience. Each of the components is discussed in further detail below.

First, the critical ratio is determined for each lot. The critical ratio is generally defined as the ratio between the time remaining until the customer due date and the work that needs to be completed to finish the product. The formula is as follows:

$$C/R = (MPS \text{ date} - \text{Today's Date})/(\text{Forecast out date} - \text{Today's Date})$$

When $0 <= C/R < 1$, a lot is behind schedule, when $C/R > 1$, a lot is ahead of schedule, and when $C/R = 1$, a lot is on schedule. A warning may be optionally generated if $C/R < 0.9$ or $C/R > 1.2$. C/R may reflect both demand and supply needs in some respects because forecasted cycle time is calculated according to the fabrication facility conditions. Wafer start policy, however, cannot simply depend on this factor because the fabrication facility condition's are too dynamic. For example, if the fab's front end WIP is congested, the forecast cycle time of a non-started lot will be long. Therefore, some lots' C/Rs may be close to one or even lower than one. If all the lots are released immediately according to the C/R, however, the congestion may become even worse. The release may not help the lots catch up with schedule, but it may hurt the fab's line balance and increase the difficulties of the fab's operations. Therefore, prioritizing lots according to the C/R is just the first step in determining the wafer start plan.

Next, a daily wafer start quota is determined by finding the minimum one of the following variables: (1) overall capacity constraints, (2) front end line balance, and (3) fab or MPS output target requirement.

Overall capacity constraints are used to control overall fab bottleneck loading. Different from the MPS output target requirement, overall capacity constraints come from the supply side instead of the demand side. Overall capacity constraints measure the bottleneck loading from the perspective of the entire fab, including the back end. Reasonable monthly output and cycle time targets may be generated according to the fab capacity and variability. Generally, according to Little's formula:

$$WIP/\text{Cycle time} = \text{Throughput rate},$$

when monthly output and cycle time targets are known, the required WIP level may be calculated. Therefore, the wafer start policy adjusts the current WIP level so that the required WIP level is achieved.

Generally, overall capacity constraints may be calculated in three ways: simulation, planner estimation, and heuristic estimation. As an example using planner estimation, assume that the current WIP is 80,000, the current throughput rate is 1200 wafers/day this month, the C/T target is 2.2 days/layer, and the required throughput rate for next month is 40,000 wafers/month. According to Little's Law, the required WIP =C/T * Throughput rate =2.2 * 40,000 =88,000. Thus, to meet the required WIP level at the middle of the month (planned at the beginning of the month), the wafer start quantity for next month =(88000−80000)15+1200=1733.

As an example using heuristic estimation, assume that the photolithography is the bottleneck area, the C/T is 2.2 days/layer, and the throughput rate is 40,000 wafers/month. According to Little's Law, WIP=C/T*Throughput rate=2.2 * 40,000=88,000. Transferring to the photo layer equivalent: 88,000 * (average total layer/2)=$\Sigma_i$lot$_i$* remaining layer$_i$+ W/S qty * average total layer. In this estimation, W/S quantity is used as the overall capacity constraint. This heuristic estimation is attempting to keep the total photo layers at a reasonable target level, and considers the photolithography conditions more closely than planner estimation.

Next, the front end line balance is analyzed. Front end capacity is given particular attention because wafer starts affect the front end immediately. Before determining a reasonable front end WIP level, the front end bottleneck tool should be identified. Generally, the bottleneck tool will have the property of either high utilization or large variability, which often may cause WIP to pile up in front of it. Therefore, the front end may be thought of as being from wafer start to the first primary bottleneck, such as the furnace area, which places a limit on the front end WIP. The front end WIP may fluctuate a great deal because of inherent furnace operations, which have large batch sizes and long process times. If one of the furnaces becomes unstable, WIP will quickly back up in front of the furnace within a short period of time.

Figure 2:
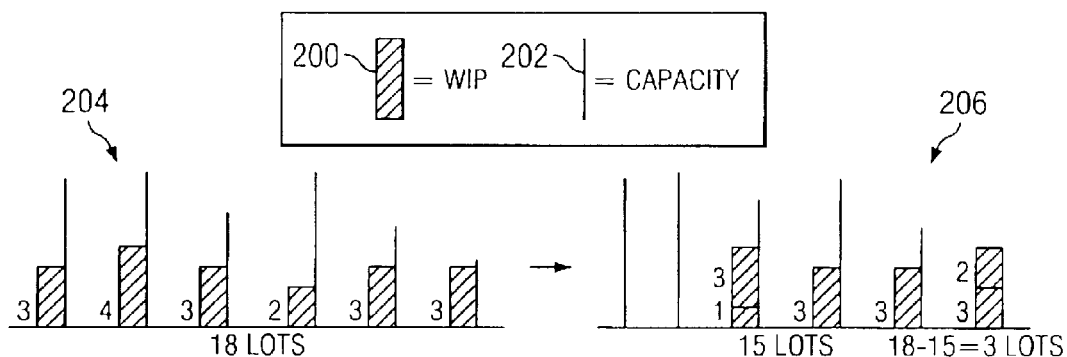
FIG. 2 is a diagram representing of WIP moving through manufacturing line.

Once the bottleneck tool is identified, a reasonable WIP level between the wafer start and the bottleneck tool may be predicted by using historical WIP data, estimation, or simulation. As with the overall capacity constraints, the wafer start policy adjusts the current front end WIP level in order to achieve the required WIP level. As an example, in a simulation, wafer start is determined according to the difference between the standard WIP level and the forecasted WIP profile. FIG. 2 provides an example of heuristic estimation. Assume that the front end WIP 200 and capacity 202 of each stage is known, that the bottleneck tool capacity is known and fixed at 3 lots per day, and that the historical front end standard WIP level is known to be 18 lots. Graph 204 shows the initial WIP at each stage. As WIP progresses through the front end, graph 206 shows that there are 15 lots remaining in the front end, and that wafer start may release 3 lots to the front end.

Figures 3, 5:
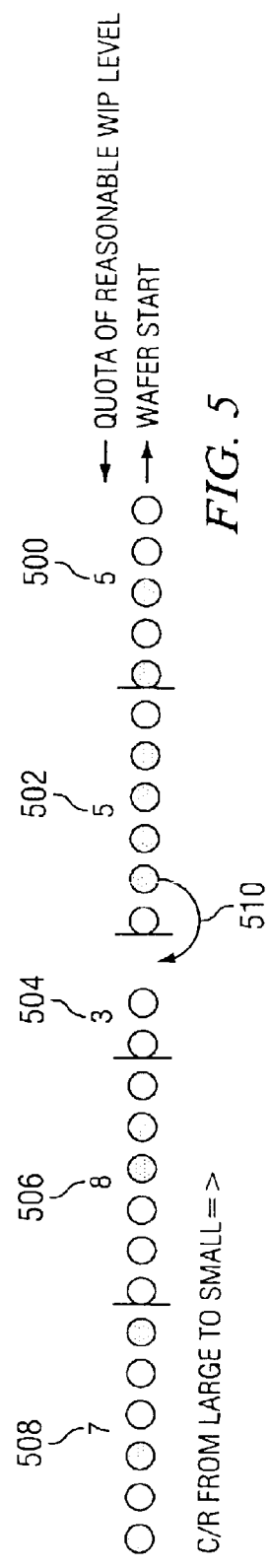
FIG. 3 is a table illustrating fab output target requirements.
FIG. 5 is a diagram illustrating the implementation of a preferred embodiment of the present invention.

With respect to the fab or MPS output target requirement, demand data (output quantity and date) and fixed cycle time may be used to estimate the wafer start quantity (e.g., an MRP approach). This value may be averaged over a number of days, so that if it is not met one day it can be increased the next day. Table 300 in FIG. 3 illustrates a simple example with two products having fixed cycle times. Practically, however, due to capacity plan and demand plan mismatch, the MPS monthly output quantity may not match the total quantity of lots with required dates in that month. Alternatively, the fab or MPS output target requirement may not be used in the initial work release calculation. Generally, when the MPS output target is consistent with the MPS date, this variable is redundant with the critical ratio.

After the initial daily work release quota is determined, detailed fab capacity limits are checked. Because machine status, WIP profile, and operator efficiency are changing variables, fab capacity is dynamic. In order to account for the fab's dynamic conditions effectively, detailed constraints, such as specific tool group capacity, batch size optimization, and limited quantity tool capacity, are analyzed.

Capacity constraints from specific tool groups, such as poly etcher, polyimide, etc., are considered in order to prevent machine overloading. Some specific tool groups can become bottlenecked under specific product mixes. For example, if there is an excess of memory product, the poly-etcher area may become a bottleneck. As another example, if overlay is critical at the photolithography area, the scanners' loading balance will also need to be maintained. In particular, with small feature size processes, such as less than 0.18 microns, each lot is processed at the same machine for multiple stages, and cannot be processed on a different machine. In a preferred embodiment for photo loading balance, if other tools are available, then there should be no more than 6 lots per tool per day to minimize the impact of a product hold request, although other quantities may be used depending on the particular fab conditions. This number provides balance with the competing rule that as much as possible of the same product should be gathered at one tool in order to minimize changeover.

Figure 4:
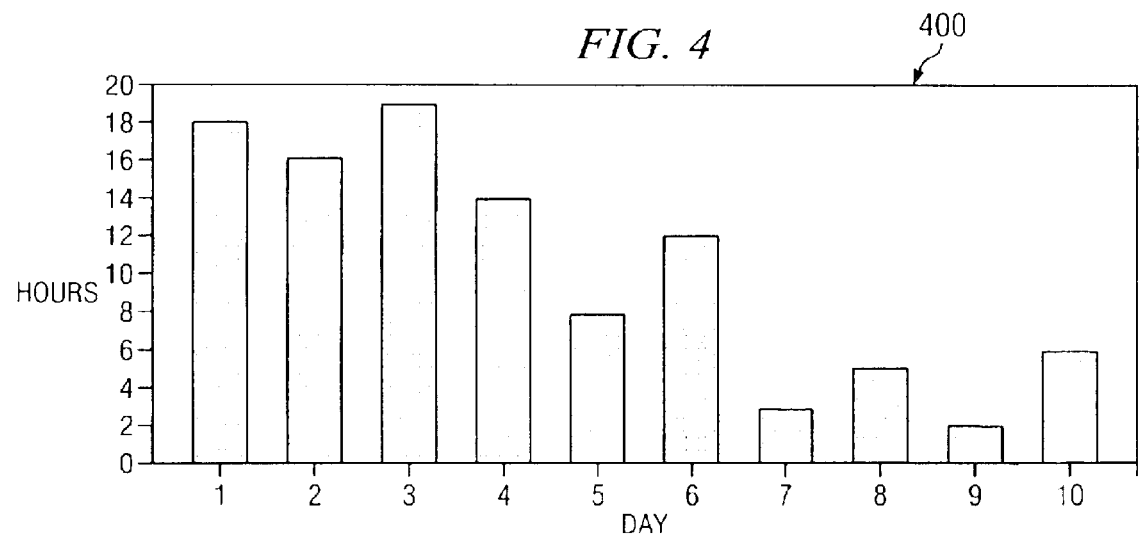
FIG. 4 is a graph illustrating static estimation of capacity constraints for specific tool groups.

Special tool groups' capacity constraints may be calculated in two ways: simulation and static estimation. Graph 400 in FIG. 4 illustrates an example of the calculation by static estimation. Assume that Tool A's capacity is 20 hours/day, that Product X takes 3 hours total, 1 hour on the $2^{nd}$ day and 2 hours on the $6^{th}$ day, and that Product Y takes 2 hours total, all on the $3^{rd}$ day. The steady state capacity check is 3X+2Y<=20 per day and the heuristic capacity check is $1X_1+2X_2+2Y_1$<=20 per day.

Batch size optimization accounts for particular work centers that have a large batch size and a long processing time, which may cause specific bottlenecks. For example, in semiconductor fab front end, many furnaces are involved in forming specific films on the wafers. In order to fully and efficiently utilize the furnaces, parts that use the same furnace recipes should be grouped together to form a batch. In addition, making lots the same size as the furnace batch size promotes efficiency.

With respect to limited quantity tools, in a semiconductor fab every product generally has its own specific photo mask for each photo layer. A lot may only be run when both its tool is available and its photo mask is ready. If too many lots that use the same mask are started at the same time, WIP congestion may be caused in the photo area. Even when many steppers or scanners are available, the lots may still have to wait because the required photo mask is being used with other lots. In a preferred embodiment for the photo mask area, a product that has only one mask set should be released at a rate of no more than 12 lots per day (i.e., less than 12 lots per part/mask per day), although other quantities may be used depending on the particular fab conditions. This provides a balance between keeping the number low enough so as not to back up parts waiting for a mask, and high enough so as to minimize changeover.

FIG. 5 illustrates an application of the wafer start policy, using release rules such as critical ratio, fab output target requirement, capacity limits, and front end line balance. There are two products in this example, the shaded circles and the non-shaded circles. First the products are prioritized by C/R, lowest to highest, with lowest C/R having the highest priority. Next, in this example the fab output target requirement is 5 lots per day. While this number is met on day 500 and day 502, it is not met on day 504, with only 3 lots being started. Therefore the fab output target requirement is increased to 5+(5−3)=7 for day 506. Because of other constraints, only 6 lots are started on day 506, so the fab output target requirement for day 508 is 5+(7−6)=6.

Next, for this example capacity limits are 3 shaded circle lots per day at most, 4 lots per product per day at most, and 6 lots per day total at most. On day 500, these rules are met. On day 502, however, there are 4 shaded circle lots, violating one of the three rules. Accordingly, lot 510 is moved to the day 504. All rules are met for days 504, 506 and 508. Finally, front end line balance is performed to provide a reasonable WIP level set by the front end tool sets. In this example, the number is 3 to 8 lots, as shown in FIG. 5. Once all wafer start rules are met as best possible, the work release plan is submitted to the fab. The preferred embodiments thus balance the various pull and push system variables, enabling detailed control of the manufacturing system without relying on planners' personal experience.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the specific values for variables and parameters provided may be varied while remaining within the scope of the present invention. In addition, not all variables described herein must be analyzed in order to accomplish the work release balancing in accordance with the present invention. For example, the detailed capacity checks may vary depending on the type of manufacturing system being used and products being processed. Moreover, the order of various steps described herein may be varied while remaining within the scope of the present invention. Finally, in some circumstances it may not be possible to meet every rule used in determining a work release plan, in which case tradeoffs generally are made to optimize the work release plan to the extent possible.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method of generating a work release plan for a manufacturing system, said method comprising:
    prioritizing scheduled lots in order of their critical ratios;
    estimating an initial daily release quota for the scheduled lots based on both pull and push requirements, wherein the initial daily release quota is estimated based on a minimum one of the following variables: overall system capacity constraints and front end line balance;
    determining detailed capacity constraints for the manufacturing system;
    testing whether the initial daily release quota complies with the detailed capacity constraints;
    if the detailed capacity constraints are violated, rearranging the lots in the initial daily release quota so that the detailed capacity constraints are met; and
    providing the work release plan such that the detailed capacity constraints are met based on the rearranging of the lots in the initial daily release quota, and based on the critical ratios, the initial daily release quota and the detailed capacity constraints.

2. The method of claim 1, wherein the critical ratio is determined by the formula: Critical Ratio =(Master Production Schedule Date−Today's Date)/(Forecast Out Date−Today's Date).

3. The method of claim 1, wherein the overall system capacity constraints indicate an overall manufacturing system bottleneck loading.

4. The method of claim 1, wherein the front end line balance indicates a front end bottleneck loading.

5. The method of claim 1, wherein the initial daily release quota is estimated based on a minimum one of the following variables: the overall system capacity constraints, the front end line balance, and fab output target requirement.

6. The method of claim 5, wherein the fab output target requirement is determined using material requirements planning.

7. The method of claim 1, wherein the detailed capacity constraints are selected from the group consisting of: specific tool group capacity, batch size optimization, limited quantity tool capacity, and combinations thereof.

8. The method of claim 7, wherein the batch size optimization includes grouping similar recipe parts together, and includes making lot size the same as a batch process' batch size.

9. A computer-implemented method of generating a wafer start plan for a semiconductor fabrication facility, said method comprising:
    prioritizing scheduled wafer lots in order of their critical ratios;
    estimating an initial daily wafer start quota based on both pull and push requirements, wherein the initial daily wafer start quota is estimated based on a minimum one of the following variables: overall system capacity constraints and front end line balance;
    determining detailed capacity constraints for the semiconductor fabrication facility;
    testing whether the initial daily wafer start quota complies with the detailed capacity constraints;
    if the detailed capacity constraints are violated, rearranging the wafer lots in the initial daily wafer start quota so that the detailed capacity constraints are met; and
    providing the wafer start plan such that the detailed capacity constraints are met based on the rearranging of the wafer lots in the initial daily wafer start quota, and based on the critical ratios, the initial daily wafer start quota and the detailed capacity constraints.

10. The method of claim 9, wherein the initial daily wafer start quota is estimated based on a minimum one of the following variables: the overall system capacity constraints, the front end line balance, and fab output target requirement.

11. The method of claim 10, wherein the front end line balance indicates a front end furnace bottleneck loading.

12. The method of claim 9, wherein one of the detailed capacity constraints is photolithography load balancing.

13. The method of claim 12, wherein the photolithography load balancing is no more than 6 lots per tool per day.

14. The method of claim 9, wherein one of the detailed capacity constraints is furnace batch size optimization.

15. The method of claim 14, wherein the furnace batch size optimization includes grouping similar recipe parts together, and includes making lot size the same as the furnace batch size.

16. The method of claim 9, wherein one of the detailed capacity constraints is photo mask capacity.

17. The method of claim 16, wherein the photo mask capacity is no more than 12 lots per part per mask per day.

18. A system for generating a work release plan for a manufacturing system, said system comprising:
   means for prioritizing scheduled lots in order of their critical ratios;
   means for estimating an initial daily release quota using both demand and supply requirements, wherein the initial daily release quota is estimated based on a minimum one of the following variables: overall system capacity constraints and front end line balance;
   means for determining detailed capacity constraints for the manufacturing system;
   means for testing whether the initial daily release quota complies with the detailed capacity constraints;
   if the detailed capacity constraints are violated, means for rearranging the lots in the initial daily release quota so that the detailed capacity constraints are met; and
   means for providing the work release plan such that the detailed capacity constraints are met based on the rearranging of the lots in the initial daily release quota, and based on the critical ratios, the initial daily release quota and the detailed capacity constraints.

19. The system of claim 18, wherein the detailed capacity constraints are selected from the group consisting of: specific tool group capacity, batch size optimization, limited quantity tool capacity, and combinations thereof.

20. A computer-readable medium having computer code recorded thereon executable by a computer, said computer code for generating a work release plan for a manufacturing system, said computer code comprising instructions for causing the computer to:
   order scheduled lots according to their critical ratios;
   estimate an initial daily release quota for the scheduled lots using both supply and demand requirements, wherein the initial daily release quota is estimated based on a minimum one of the following variables: overall system capacity constraints and front end line balance;
   determine detailed capacity constraints for the manufacturing system;
   test whether the initial daily release quota complies with the detailed capacity constraints;
   if the detailed capacity constraints are violated, rearrange the lots in the initial daily release quota so that the detailed capacity constraints are met; and
   providing the work release plan such that the detailed capacity constraints are met based on the rearranging of the lots in the initial daily release quota, and based on the critical ratios, the initial daily release quota and the detailed capacity constraints.

* * * * *